UNITED STATES PATENT OFFICE.

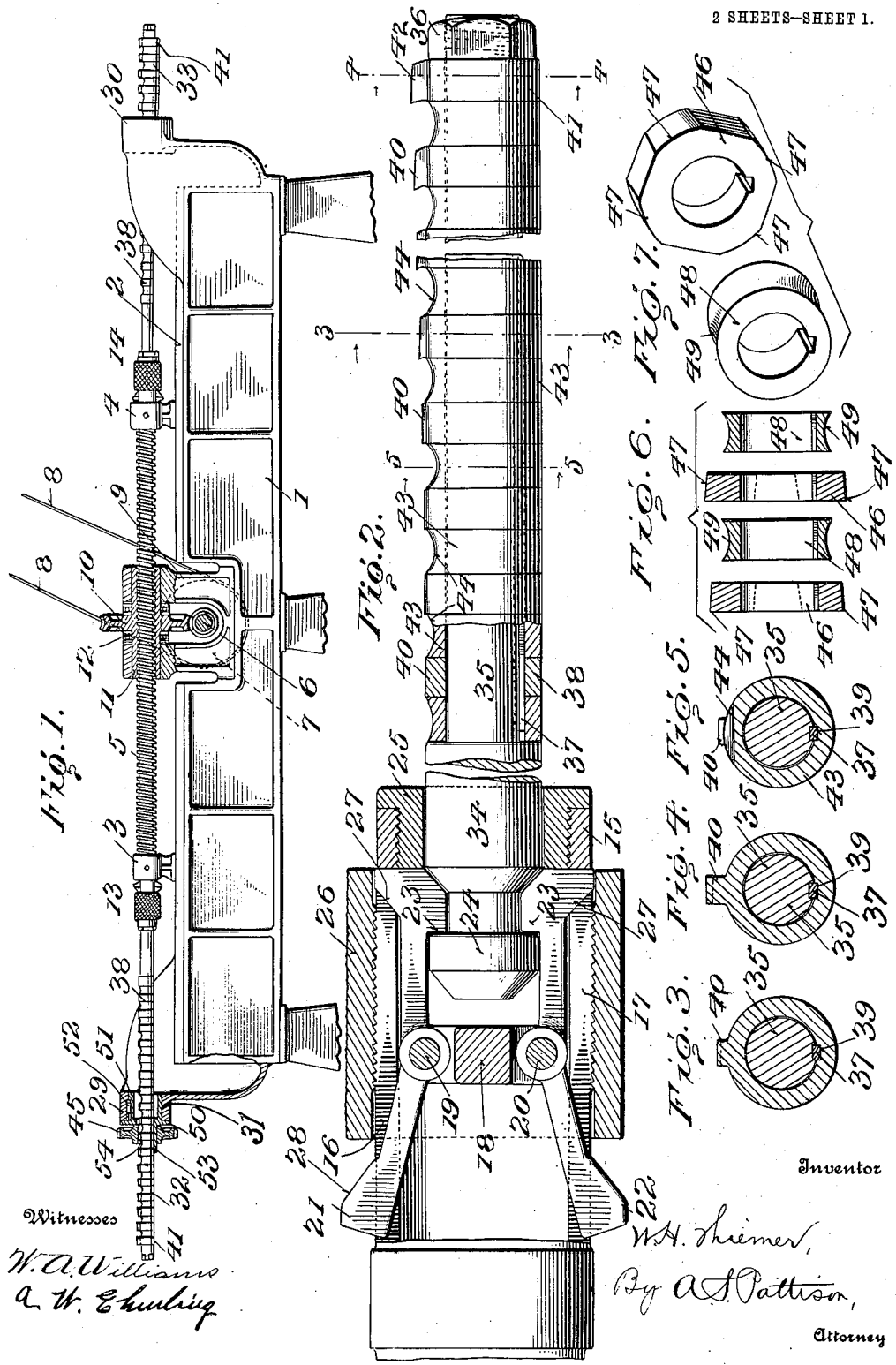

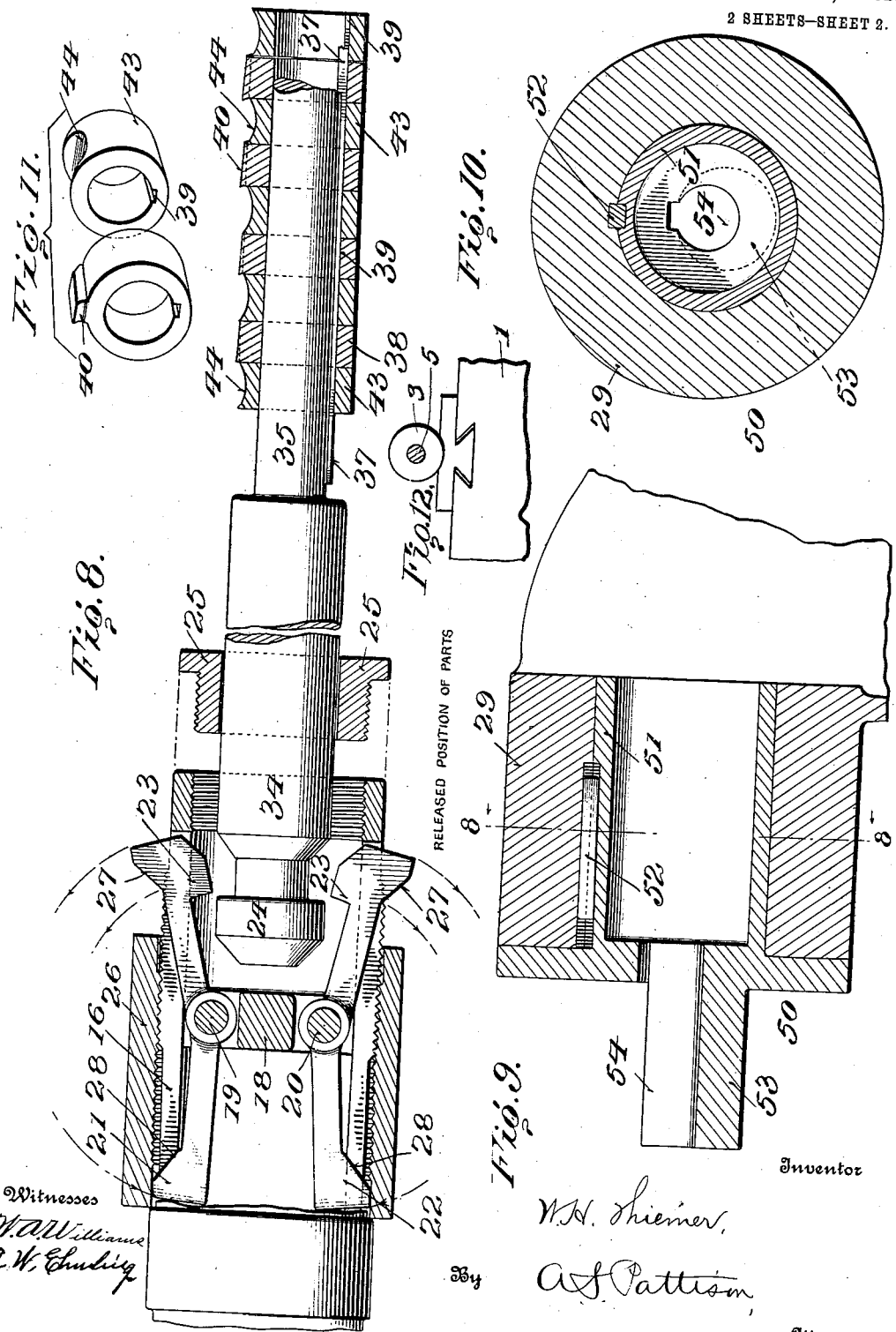

WILLIAM H. THIEMER, OF CLEVELAND, OHIO, ASSIGNOR TO THE WINTON MOTOR CARRIAGE COMPANY, OF CLEVELAND, OHIO.

BROACHING-MACHINE.

988,154.

Specification of Letters Patent. Patented Mar. 28, 1911.

Application filed December 9, 1908. Serial No. 466,689.

*To all whom it may concern:*

Be it known that I, WILLIAM H. THIEMER, a citizen of the United States, residing at Cleveland, in the county of Cuyahoga and State of Ohio, have invented certain new and useful Improvements in Broaching-Machines, of which the following is a specification, reference being had therein to the accompanying drawing.

My invention relates to improvements in broaching machines, and the broaches used thereon.

The object of my invention is to provide a double-headed broaching machine whereby one broach is cutting on a piece of work during the movement to the right, and the broach at the opposite end cutting on a second piece of work on the movement to the left.

Another object of my invention is to provide a broach which is composed of a series of separable independent parts, which can be replaced or removed when they become worn or broken.

A still further object of my invention is to provide a more simple, cheap and effective broach having many details of structure hereinafter more fully pointed out.

In the accompanying drawings, Figure 1, is a side elevation of a table supporting my broach and showing the broach partly in section. Fig. 2, is an enlarged side elevation of my improved broach partly in section, and showing the chuck with the broach therein. Fig. 3, is a vertical, transverse, sectional view taken on the line 3—3 of Fig. 2. Fig. 4, is a vertical, transverse, sectional view taken on the line 4—4 of Fig. 2. Fig. 5, is a vertical, transverse, sectional view taken on the line 5—5 of Fig. 2. Fig. 6, is a longitudinal, detailed, sectional view of the cutters and clearance disks of a modified form for cutting an angular hole in the gear wheel. Fig. 7, is a perspective view of a cutting ring and a clearance ring used in cutting an angular opening in the wheel. Fig. 8, is a longitudinal sectional view of the chuck showing the jaws released so that the broach can be removed. Fig. 9, is an enlarged, longitudinal, sectional view of an attachment whereby the broach can operate upon gears with openings of greater diameter than the broach. Fig. 10, is a transverse, sectional view taken on the line 8—8 of Fig. 9. Fig. 11, is a perspective view of the cutter and clearance rings such as used in Fig. 2 of the drawings. Fig. 12 is a transverse sectional view showing the dovetail connection between the bed-plate 1 and the slidable supports 3 and 4.

Referring now to the drawings, 1 represents a table or bed plate having in its upper face 2 a dovetail groove in which are slidably mounted the supports 3 and 4 which are located about midway the ends from a central point, as clearly shown in Fig. 1. Extending longitudinally the bed-plate and parallel therewith is a threaded bar 5 which has its ends rigidly mounted in the supports 3 and 4, whereby the bar is prevented from rotating, yet allowed to move longitudinally and carry with it the supports 3 and 4.

Mounted in the bed-plate and extending transverse thereof is a worm 6 carrying a pulley 7 driven by a belt 8 which is a cross and a straight belt, whereby the worm may be first driven in one direction and then the other, the purpose of which will be hereinafter more fully described.

The bed-plate 1 has located therein midway its ends a plate 9 which is forked and adapted to straddle the worm 6. Between the arms of the plate 9 is a worm-gear 10 meshing with the worm 6, and said worm gear has an elongated hub portion 11 rotatably mounted in the arms of the plate 9 and internally threaded, and said threads mesh with the threads of the bar 5. In order to prevent friction between the arms and the worm-gear I provide the sides of the worm-gear with a ball-race in which are carried ball bearings 12 which bear against the inner face of the arms of the plate 9, and prevent longitudinal movement of the worm gear, yet allow it to freely revolve.

The ends of the bar 5 are provided with chucks 13 and 14 which are adapted to receive and hold the broaches and which are so constructed that they can be readily removed for inserting the work thereon, which I will now proceed to describe.

The clutches consist of a sleeve 15 rigidly keyed or otherwise secured upon the end of the bar 5, and having on opposite sides the slots 16 and 17, and fitting within said sleeve is placed a collar 18 to which are pivoted at 19 and 20 the arms 21 and 22, and which extend out through the slots 16 and 17. The said arms are constructed as shown and have hooked outer ends 23 adapted to catch over the arrow-head 24 of the broach, whereby the same is held therein. In order to lock the collar 18 in the sleeve I provide the cap 25, screwed into the sleeve. The outer face of the sleeve 15 is screw-threaded, and screwed thereon is the elongated member 26 having the smooth inner surface at its ends which are adapted to engage the beveled surfaces 27 and 28 of the arms 21 and 22, and rock the same on their pivots. When the sleeve is screwed outwardly it engages the beveled surface 27 of the arms and forces the hooked ends 23 inwardly to engage the arrow-head of the broach and firmly lock the same. By moving the sleeve inwardly it engages the beveled surfaces 28 of the arms and moves the inner ends inwardly, throwing the hooked ends outwardly and allowing the broach to be removed.

The ends of the bed plate 1 are provided with upwardly-extending portions 29 and 30 having openings 31 through which the broaches 32 and 33 pass, and said openings being of a size considerably larger than the broach for the purpose hereinafter more fully described. The outer faces of the portions 29 and 30 of the bed-plate are smooth and in a perfect vertical alinement, and against these the gear or wheel being operated on is firmly held.

The broaches consist of the main body portion 34 of a size to snugly fit the chuck and have the arrow-head 24 heretofore described. The said broach is provided with the elongated reduced cutter holding portion 35 and has its outer end screw-threaded and adapted to receive a nut 36 for clamping the cutters thereon. The said reduced portion 35 is provided with a feather 37 for locking the cutters thereon against rotation. The cutters consist of disks or rings 38 having central openings to receive the portion 35, and also provided with the key seat 39 adapted to receive the feather 37 and prevent the same from rotating. The disks or rings are provided with cutting projections 40 which start on the inner ring or disk 38 of a length of a few thousandths of an inch, and each succeeding disk has its projection slightly larger until the outer ring or disk 41 has a projection 42 of the length shown in Fig. 2. Between the rings or cutters are the spacers 43 which are keyed upon the portion 35 the same way as the cutters and are of the same diameter. The outer periphery of the spacers at the upper end opposite the cutting projections are provided with transverse grooves 44 forming clearances in which the stock falls as it is cut and conveyed through the gear.

Any desired number of cutters can be used on the broach, and as will be seen, the broach does not cut upon the outward or pushing movement thereof, but cuts on the pulling movement, and therefore the cutting projections increase from the inner end toward the outer end.

When the bar 5, Fig. 1, is in its extreme position to the left, the broach 32 is removed and the gear 45 is placed upon the inner end of the same, and the broach placed in the chuck 13, and the machine is started so as to move the bar 5 to the right. The gear 45 is drawn against the portion 29 and firmly held while the first cutter 38 is acting or cutting the key-way in the hub thereof. Before the cutter 38 has passed from the hub the next cutter enters the hub and starts cutting or increasing the depth of the key-way, and thus it will be seen that the gear is prevented from rotating. When the bar 5 has reached its extreme movement to the right, the broach 33 is removed and a gear placed thereon, and the movement of the bar 5 to the left causes the broach to hold the gear against the portion 30 and cut a key-way therein, and thus the machine is cutting on both movements to the right and left.

When it is desired to cut an angular opening in the gear, I provide a cutter as indicated at 46, Fig. 7, which has the cutting edges 47 at the corners, and when such cutters are used a clearance disk 48 is used having the groove 49 entirely surrounding the outer periphery thereof. While I have here shown this form of cutter, it will be understood that any desired form can be used.

In cutting gears of different sizes and necessarily having openings of different diameters, I provide an eccentric block 50 which has an enlarged shank portion 51 keyed by the key 52 in the opening of the member 29. The outer end 53 is provided with an eccentric opening 54. The member 53 is made of different sizes to fit the different size openings in the gears, and the opening 54 communicating with the outer periphery at the upper face, it will be seen that the cutters of the broach will extend therethrough and will be brought in engagement with the gear for cutting the key-way, thus using the same broach in gears of different sizes with openings of different sizes.

While I have shown and described this specific form of broach it will be understood that I do not claim the same as this forms a part of a divisional application.

Having thus described my invention, what I claim and desire to secure by Letters Patent, is:—

1. A broaching machine comprising a support, a threaded bar carried by the support, and held against rotation, a broach removably carried by each end of the bar, a member in threaded engagement with the bar, and means for rotating said member whereby the bar is moved longitudinally.

2. A broaching machine comprising a support, a threaded bar carried by the support and held against rotation, a broach carried by each end of the bar, a member in threaded engagement with the bar, and means for rotating said member, whereby the bar is moved longitudinally.

3. A broaching machine comprising a support, a threaded bar carried by the support and held against rotation, a broach removably secured to each end of the bar, a worm-gear having threaded connections with the bar, a worm meshing with the worm-gear, and means whereby the worm may be driven in either direction, whereby the bar is moved back and forth.

4. A broaching machine comprising a support, a double headed broach, a work support adjacent each end of the broach, and means intermediate the heads of the broach for moving the same, whereby the separate work is operated upon during the movement to the right and to the left.

5. A broaching mechanism comprising a double headed broach, means intermediate the heads of the broach for moving the same to the right and left, whereby the same can operate on separate work during the pulling movement thereof.

6. A broaching machine comprising a support, a horizontally movable bar carried thereby and held against rotation, means for moving the bar longitudinally upon the support, a chuck carried by each end of the bar, and broaches carried by the chuck and adapted to operate on separate work during the movement to the right and left.

7. A broaching machine comprising a support, a horizontally-movable bar carried by the support and held against rotation, means for moving the bar longitudinally upon the support, a chuck carried by both ends of the bar, broaches carried by the chucks, and projections carried by the support at each end and against which the work being operated on bears whereby the broaches are adapted to operate on separate work during the movement to the right and left.

8. A broaching machine comprising a support, a horizontally-movable threaded bar carried by the support and held against rotation, a worm-gear threaded on said bar, a worm meshing with said worm-gear, means for rotating said worm in either direction, a broach removably carried by each end of the bar, and stops carried by the support against which the work is held by the drawing movement of the broaches.

9. A broaching machine comprising a support, a horizontally-movable threaded bar carried by the support, and held against rotation, a worm-gear screwed on the bar, a worm extending transverse the support and meshing with the worm-gear, means whereby the worm may be rotated in either direction, and a removable broach carried by each end of said bar.

10. A broaching machine comprising a horizontal bed-plate having a groove in its upper face, guide plates mounted in the groove, a horizontal bar between and mounted in said guides and held against rotation, means for moving the bar longitudinally, broaches carried by the bar on the outside of the guide plates, and work-supporting brackets carried by the outer ends of the bed-plate and against the outer face of which the work may be held by the drawing action of the broaches.

11. A broaching machine comprising a horizontal bed-plate, a bar horizontally movable thereon and held against rotation, means for moving the bar longitudinally, brackets carried by the ends of the bed-plate, broaches carried by the ends of the bar and passing through enlarged openings in the brackets, an eccentric block within the openings in the brackets and through which the broaches pass, substantially as described.

12. A broaching machine comprising a horizontal bed-plate, a bar horizontally movable thereon and held against rotation, means for moving the bar longitudinally, brackets carried by the ends of the bed-plate, and having horizontal openings therethrough, blocks within said openings and having an eccentric extension adapted to support the gear being operated on, and broaches rigidly carried by the bar and passing through the blocks in the brackets.

13. A broaching machine comprising a bed-plate, having a central depression, a bifurcated plate rigidly secured in said depression, a worm-gear having elongated hubs journaled in the arms of the bifurcated plate, a roller bearing between the edges of the arms and the sides of the worm gear, a worm meshing with the gear, means for rotating the worm in either direction, a threaded bar passing through the gear and having threaded connection therewith, the bed-plate having dovetail grooves therein, blocks slidable in the grooves and in which the bar is rigidly secured, and broaches removably carried by the ends of the bars on the outside of the blocks.

14. A broaching machine comprising a support, a horizontally movable bar, a broach carried by each end of the bar, means for moving said bar longitudinally, and a work support at each end of the support and through which the broaches work and against which the work is supported by the inward movement of the broach.

15. A broaching machine comprising a support, a horizontally movable bar, a broach carried by each end of the bar, means for moving said bar, a work support carried by each end of the support and against which the work is held by the broach, a guide carried by the bar adjacent each broach and slidable on the support.

16. A broaching machine comprising a support, a horizontally movable bar, means at the center of the bar for moving it longitudinally, a chuck carried by the outer ends of said bar, a broach removably secured in each chuck, a work support carried by each end of the support and through which the broaches pass and the work adapted to bear against the outer face and held in said position by the inward movement of the broach, and guides carried by the bar intermediate the operating means and chucks slidably on the support.

17. A broaching machine comprising a bed-plate, having a central depression, a plate secured in said depression, a screw-threaded bar longitudinally movable in said plate and held against rotation, a worm gear journaled in the plate and threaded on the bar, a worm meshing with said gear, means for rotating the worm in either direction, the bed-plate having longitudinal grooves therein, blocks slidable in the grooves and rigidly carried by the outer end of said bar, chucks carried by the outer ends of the bar, broaches removably secured in the chucks, and work supporting brackets carried by the bed plates on opposite sides of the brakes.

In testimony whereof I affix my signature in presence of two witnesses.

WILLIAM H. THIEMER.

Witnesses:
W. J. WARD,
ERLA LICHTENBERGER.